US010859521B2

(12) United States Patent
Deshpande et al.

(10) Patent No.: US 10,859,521 B2
(45) Date of Patent: Dec. 8, 2020

(54) METHODS OF MEASURING SOLIDS CONTENT IN A SLURRY CATALYST COMPOSITION

(71) Applicant: Univation Technologies, LLC, Houston, TX (US)

(72) Inventors: Kishori Deshpande, Freeport, TX (US); Gian C. Gobbi, Naples, FL (US); Nathan Rau, Freeport, TX (US)

(73) Assignee: Univation Technologies, LLC, Houston, TX (US)

(*) Notice: Subject to any disclaimer, the term of this patent is extended or adjusted under 35 U.S.C. 154(b) by 34 days.

(21) Appl. No.: 16/461,710

(22) PCT Filed: Nov. 15, 2017

(86) PCT No.: PCT/US2017/061769
§ 371 (c)(1),
(2) Date: May 16, 2019

(87) PCT Pub. No.: WO2018/093877
PCT Pub. Date: May 24, 2018

(65) Prior Publication Data
US 2019/0360952 A1 Nov. 28, 2019

Related U.S. Application Data

(60) Provisional application No. 62/423,637, filed on Nov. 17, 2016.

(51) Int. Cl.
G01N 24/08 (2006.01)
(52) U.S. Cl.
CPC .................. G01N 24/082 (2013.01)
(58) Field of Classification Search
CPC .................................. G01N 24/082
See application file for complete search history.

(56) References Cited

U.S. PATENT DOCUMENTS

| 4,866,385 A * | 9/1989 | Reichwein ........... G01N 24/082 324/300 |
| 8,314,191 B2 * | 11/2012 | Collins .................. C08F 10/00 526/160 |
| 2011/0137003 A1 | 6/2011 | Collins et al. |

FOREIGN PATENT DOCUMENTS

WO 2010021768 2/2010

OTHER PUBLICATIONS

International Search Report & Written Opinion for related PCT Application PCT/US2017/061769, dated Feb. 13, 2018 (10 pgs).
(Continued)

Primary Examiner — G. M. A Hyder
(74) Attorney, Agent, or Firm — Brooks, Cameron & Huebsch, PLLC

(57) ABSTRACT

The present disclosure provides a method of measuring a percent solids content (PSC) of solids by mass in a slurry catalyst composition, where the solids include a catalyst. The method includes obtaining a first time domain (TD) $^1$H-nuclear magnetic resonance (NMR) spectrum using a time domain (TD)-NMR spectrometer and a test sample of the slurry catalyst composition from which a value of a voltage signal (a) that represents the slurry catalyst composition is determined. A second TD $^1$H-NMR spectrum using the TD NMR spectrometer is obtained for a neat sample of the suspension liquid for the solids of the slurry catalyst composition, where a value of a voltage signal (b) from the second TD $^1$H-NMR spectrum that represents the suspension liquid for the solids of the slurry catalyst composition is determined. The percent solids content (PSC) of solids in a slurry catalyst composition is then determined with Equation I: PSC=$(1-a/b \times d_b/d_a) \times 100\%$ Equation I where x represents mathematical multiplication, a and b are as described above, db is a density of the suspension liquid for the solids
(Continued)

of the slurry catalyst composition and $d_a$ is a density of the slurry catalyst composition.

10 Claims, 2 Drawing Sheets

(56) References Cited

OTHER PUBLICATIONS

International Preliminary Report on Patentability for related PCT Application PCT/US2017/061769, dated May 31, 2019 (7 pgs).

* cited by examiner

METHODS OF MEASURING SOLIDS CONTENT IN A SLURRY CATALYST COMPOSITION

This application is a National Stage Application under 35 U.S.C. § 371 of International Application Number PCT/US2017/061769, filed Nov. 15, 2017 and published as WO 2018/093877 on May 24, 2018, which claims the benefit to U.S. Provisional Application 62/423,637, filed Nov. 17, 2016, the entire contents of which are incorporated herein by reference in its entirety.

TECHNICAL FIELD

The present disclosure relates to methods of measuring solids content in a slurry catalyst composition.

BACKGROUND

Gas-phase fluidized bed processes are used to produce a wide variety of polymers. In a conventional gas-phase fluidized bed process a gaseous stream containing one or more monomers is passed into a fluidized bed reactor containing a bed of growing polymer particles in a polymerization zone, while continuously or intermittently introducing a polymerization catalyst into the polymerization zone. The desired polymer product is withdrawn from the polymerization zone, degassed, stabilized and packaged for shipment.

Reactions inside the polymerization zone of gas-phase fluidized bed processes require a precise mass balance of each component to produce the desired polymer. For example, reactions having a ratio error as small as 2% can produce unusable products. One difficulty in operating a gas-phase fluidized bed as a continuous process is that the reaction components cannot be weighed into the reaction. Rather volumetric flowmeters are used with a flow computer to infer mass flow by compensating for process temperature and pressure. These measurements, however, must be made separately and each one introduces uncertainty. The resulting measurement may not always be reliable enough for continuous processing using the gas-phase fluidized bed.

Adding to the error is the fact that the slurry catalyst composition injected into the polymerization zone is likely to vary in percent solid content of solids. Knowing the percent solid content in the slurry catalyst composition is important as this information helps in determining the catalyst activity of the slurry catalyst composition. Add too much catalyst or too little catalyst and the properties of the resultant polymer will be different than the properties established for the particular polymer product. So, knowing the percent solid content of the slurry catalyst composition allows the user to more accurately and repeatably make a consistent polymer product using different batches of the slurry catalyst composition.

Therefore, there is a need in the art for a rapid and accurate of measuring percent solids content of solids in a slurry catalyst composition.

SUMMARY

The present disclosure provides a method of rapidly and accurately measuring a percent solids content (PSC) of solids by mass in a slurry catalyst composition having solids and a suspension liquid for the solids. The solids of the slurry catalyst composition include a catalyst for use with a polymerizable feedstock in a polymerization reactor to produce a polymer. The method includes preparing a test sample of the slurry catalyst composition. A first time domain $^1$H-nuclear magnetic resonance (TD $^1$H-NMR) spectrum is obtained using a time domain (TD)-NMR spectrometer and the test sample of the slurry catalyst composition for use in producing the polymer in the polymerization reactor. The first TD $^1$H-NMR spectrum is measured in the TD-NMR spectrometer at a temperature in the range of 10° C. to 70° C. In an additional embodiment, the first TD $^1$H-NMR spectrum is measured in the TD-NMR spectrometer at a temperature in the range of 10° C. to 40° C. A value of a voltage signal (a) is determined from the first TD $^1$H-NMR spectrum that represents the slurry catalyst composition.

In addition, a neat sample of the suspension liquid (i.e., only the suspension liquid) for the solids of the slurry catalyst composition is prepared. A second TD $^1$H-NMR spectrum using the TD-NMR spectrometer is obtained for the neat sample of the suspension liquid for the solids of the slurry catalyst composition. The second TD $^1$H-NMR spectrum is measured in the TD NMR spectrometer at the same temperature used in obtaining the first TD $^1$H-NMR spectrum. A value of a voltage signal (b) is determined from the second TD $^1$H-NMR spectrum that represents the suspension liquid for the solids of the slurry catalyst composition.

The PSC of solids in a slurry catalyst composition is determined with Equation I:

$$PSC = (1 - a/b \times d_b/d_a) \times 100\% \qquad \text{Equation I}$$

where x represents mathematical multiplication, a and b are as described above, $d_b$ is a density of the suspension liquid for the solids of the slurry catalyst composition and $d_a$ is a density of the slurry catalyst composition for use in producing the polymer in the polymerization reactor. Both densities $d_b$ and $d_a$ are measured at the same temperature used in obtaining the first TD $^1$H-NMR spectrum.

DETAILED DESCRIPTION

Figure 1:
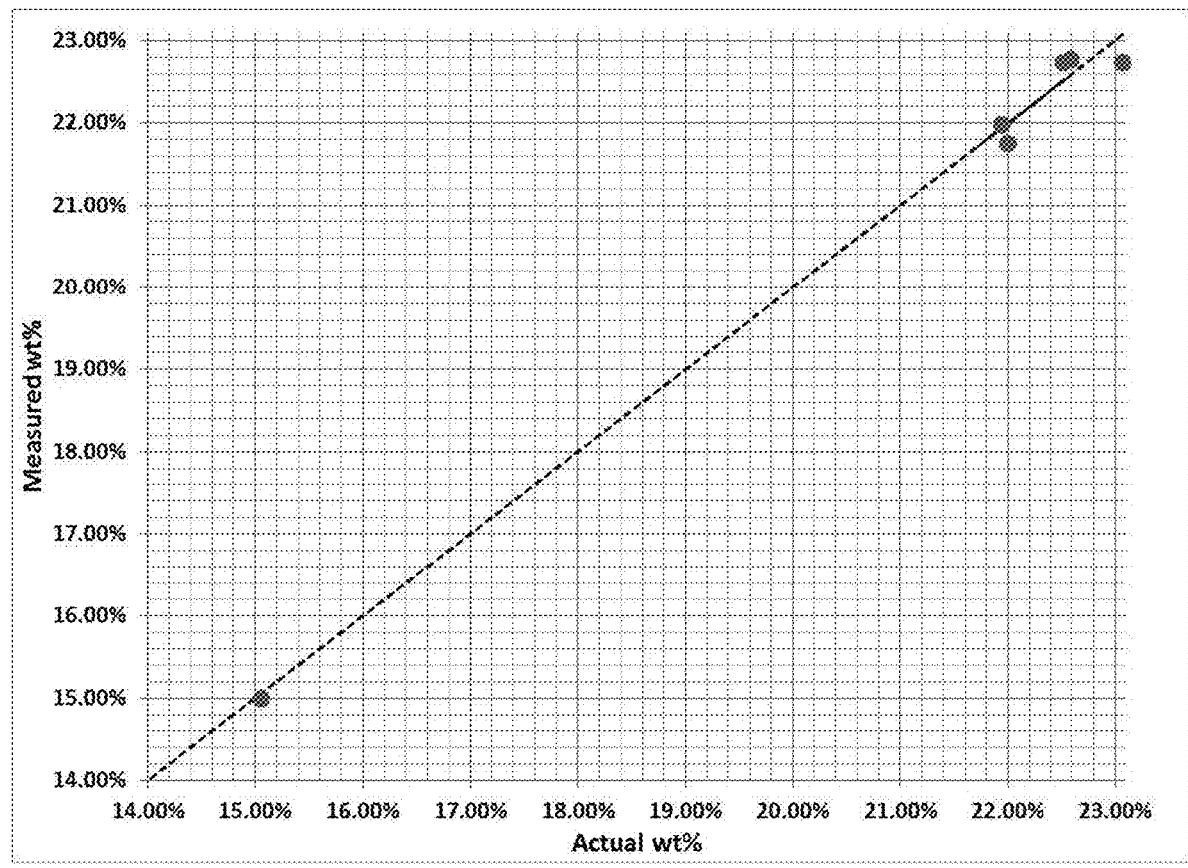
FIG. 1 is a parity plot for measured and actual wt % solids obtained according to the present disclosure.

As noted, even though current manufacturing practices provide catalysts synthesis of a catalytically active formulation, issues such as accurate measurement of solids content in the catalyst slurry persist. An accurate knowledge of the solids content in the catalyst slurry is needed for correct estimation of active metal in the catalyst (e.g. aluminum and zirconium) as well as for calculating the catalyst productivity. These goals can be accomplished with the present disclosure as it provides a method of rapidly and accurately measuring a percent solids content (PSC) of solids by mass in a slurry catalyst composition having solids and a suspension liquid for the solids.

Specifically, the method of the present disclosure is performed using a time-domain (TD)-nuclear magnetic resonance (NMR) spectrometer, where the use of the TD-NMR for the present method does not require the use of calibration standards or independently determined "migration" correlation factors. The present method also provides for an improvement in accuracy (less than 1 percent (%) relative error) over the conventional approach (typically 10-15% error) involving calibration standards. The method is useful for measuring a PSC of solids by mass in a slurry catalyst composition having solids in a range of 10% to 50% by mass. The present disclosure also provides a method for measuring solids content in ternary catalyst slurries (gas, liquid and solids), as will be discussed more fully herein. Before discussing more specifics of the present disclosure, however, it is noted that the methods of the present disclosure are applicable with any suspended solids in a hydrocarbon solvent, where the solids do not contain any materials that act as an NMR relaxation agent.

The solids of the slurry catalyst composition include a catalyst for use with a polymerizable feedstock in a polymerization reactor to produce a polymer. The method includes preparing a test sample of the slurry catalyst composition. A first time domain (TD) $^1$H-nuclear magnetic resonance (NMR) spectrum is obtained using a TD-NMR spectrometer and the test sample of the slurry catalyst composition for use in producing the polymer in the polymerization reactor. The first TD $^1$H-NMR spectrum is measured in the TD-NMR spectrometer at a temperature in the range of 10° C. to 70° C. In an additional embodiment, the first TD $^1$H-NMR spectrum is measured in the TD-NMR spectrometer at a temperature in the range of 10° C. to 40° C. A value of a voltage signal (a) is determined from the first TD $^1$H-NMR spectrum that represents the slurry catalyst composition. The voltage signal (a) can be measured from a signal of the TD $^1$H-NMR spectrum, where the signal is plotted as a function of time. For the various embodiments, the voltage signal (a) is measured from the first TD $^1$H-NMR spectrum in a range of 65 microseconds (μs) to 75 μs. The range in which the voltage signal (a) can be measured, however, is not limited to 65 μs to 75 μs, as this range may change depending upon the combination of solids and the suspension liquid for the solids of the slurry catalyst composition.

In addition, a neat sample of the suspension liquid for the solids of the slurry catalyst composition is prepared. A second TD $^1$H-NMR spectrum using the TD-NMR spectrometer is obtained for the neat sample of the suspension liquid for the solids of the slurry catalyst composition. The second TD $^1$H-NMR spectrum is measured in the TD-NMR spectrometer at the same temperature used in obtaining the first TD $^1$H-NMR spectrum. A value of a voltage signal (b) is determined from the second TD $^1$H-NMR spectrum that represents the suspension liquid for the solids of the slurry catalyst composition. The voltage signal (b) can be measured from a signal of the second TD $^1$H-NMR spectrum, where the signal is plotted as a function of time. For the various embodiments, the voltage signal (b) is measured from the second TD $^1$H-NMR spectrum in a range of 65 microseconds (μs) to 75 μs. The range in which the voltage signal (b) can be measured, however, is not limited to 65 μs to 75 μs, as this range may change depending upon the suspension liquid for the solids of the slurry catalyst composition. For the various embodiments, the range in which the voltage signal (a) is measured from the first TD $^1$H-NMR spectrum will also be the range in which the voltage signal (b) is measured from the second TD $^1$H-NMR spectrum.

The percent solids content (PSC) of solids in a slurry catalyst composition is then determined with Equation I:

$$PSC=(1-a/b \times d_b/d_a) \times 100\% \qquad \text{Equation I}$$

where x represents mathematical multiplication, a and b are as described above, $d_b$ is a density of the suspension liquid for the solids of the slurry catalyst composition and $d_a$ is a density of the slurry catalyst composition for use in producing the polymer in the polymerization reactor. The densities $d_b$ and $d_a$ are both measured at the same temperature used in obtaining the first TD $^1$H-NMR spectrum. Density can be measured according to known techniques, including the use of digital density meters/analyzers or ASTM D792-13, among others.

The slurry catalyst composition is prepared by combining a catalyst with a suspension liquid to form the slurry catalyst composition. In one exemplary process, the catalyst may be combined with and/or reacted with the suspension liquid to form the slurry catalyst composition. The slurry catalyst composition may then be sent to a mixing device. After sufficient contact time in the mixing device, the slurry catalyst composition is removed from the mixing device and is introduced to a polymerization reactor utilizing a slurry catalyst feed system. U.S. Pat. Nos. 6,606,675, 6,608,149, and 6,956,089 provide examples of such slurry catalyst feed systems.

The current disclosure also provides a system for feeding the slurry catalyst composition that includes a slurry feed system having a slurry flow meter and a catalyst injection device, where the slurry flow meter measures the slurry catalyst composition flow rate to the catalyst injection device. The slurry flow meter measures the flow of the slurry catalyst composition through the slurry feed system. The slurry flow meter may be of a design suitable for measuring the flow of the slurry catalyst composition. For example, the slurry flow meter may be Coriolis-type flow meters, such as the Micromotion CFM-010M. Coriolis-type flow meters may generate about 20 to 70 kPa (3 to 10 psi) differential pressure at typical injection system flow rates.

The suspension liquid for the solids may be a hydrocarbon carrier liquid. Examples of a hydrocarbon carrier liquid include an alkane such as isopentane or hexane, or may be an alkene co-monomer, such as hexene, butene, or other suitable liquid that is normally added to the process. A suitable suspension liquid preferably aids in the dispersal of the slurry catalyst composition once the mixture exits the injection device in the polymerization reactor. Specific examples include Hydrobrite 380 (Sonneborn, Petrolia Pa.) and Isopar C solvent (Exxon Mobil, Irving Tex.).

The system can also utilize a carrier gas to help carry the slurry catalyst composition into the polymerization reactor. The carrier gas may be an inert gas, for example nitrogen. A carrier gas control device may control the flow of the carrier gas. The system can further include a carrier/catalyst mixer. The carrier/catalyst mixer may be an in-line mixing device designed for downward flow that provides mixing of the slurry catalyst composition. In at least one embodiment, the carrier/catalyst mixer is located before the carrier gas is injected into the mixed stream. The flow rates of the suspension liquid and carrier gas affects the flow rate of the slurry catalyst composition. Thus, in some embodiments, the suspension liquid flow rate or carrier gas flow rate may be adjusted to adjust the catalyst composition flow rate.

The slurry catalyst composition flow rate may be controlled, for example by increasing or decreasing by an automated control system. Automated control systems may be an automated control system, including electronic distributive control systems or computer control systems. In other embodiments, the control may be accomplished manually.

Catalysts suitable for the present disclosure include Ziegler-Natta catalysts, chromium based catalysts, metallocene catalysts, and/or bimodal catalysts that are used with a suspension liquid to form a slurry catalyst composition. As mentioned herein, the slurry catalyst composition used in preparing the test sample of the slurry catalyst composition can be characterized as having a range of 10 percent (%) to 50% of solids on a mass to mass basis. Preferably, the slurry catalyst composition used in preparing the test sample can have a range of 10 percent (%) to 30% of solids on a mass to mass basis.

Specific examples of such catalysts include the UCAT™ catalysts from Univation Corporation. These catalysts include both Ziegler-Natta catalysts (UCAT™ A and UCAT™ J) and chromium catalysts (UCAT™ B, UCAT™ G, ACCLAIM™ K-100 Series); XCAT™ metallocene catalysts (XCAT™ HP-100, XCAT™ EZ-100); and PRODIGY™ bimodal catalysts. A preferred example of the slurry catalyst composition includes PRODIGY™ BMC-200, a bimodal catalyst (BMC), which is a catalyst formulation that results in a bimodal polymer in a single reactor. The PRODIGY™ BMC-200 catalyst comprises a high molecular weight (HMW)-polyethylene (PE) catalyst HN5 and a low molecular weight (LMW)-PE catalyst e.g. X-1 and a common activator methyl aluminoxane (MAO) in Cab-O-Sil® silica filler (TS-610 grade, Cabot Corporation, Tuscola Ill.). The catalyst slurry composition of the present disclosure can also include a trim catalyst, as are known.

Referring again to the polymerization reactor, the catalyst injection devices may be a design suitable for injecting the slurry catalyst composition into the polymerization reactor. U.S. Pat. Nos. 6,606,675, 6,608,149, and 6,956,089 discuss slurry catalyst compositions, systems for producing the slurry catalyst compositions, and injection equipment (devices) suitable for use with the current disclosure. The catalyst injection devices may comprise a catalyst injection tube that passes into the reactor through a packing and extends into the fluid bed. The depth of insertion typically depends on the diameter of the reactor and may extend in about 1/20 to 1/2 of the reactor diameter, about 1/10th to 1/2, or about 1/5th to 1/3rd of the reactor diameter. The injection tube may be supported inside a structure (support tube) within the fluid bed to provide structural integrity. This support tube may be a heavy walled pipe with an internal diameter of from about 0.64 cm to about 12.7 cm (1/4 inch to 5 inches). The support tube may extend through the reactor wall to approximately the length of the injection tube, allowing the injection tube to extend past it up to about 25.4 cm (10 inches). In some embodiments, the injection tube may end just inside the end of the support tube. The end of the support tube in the reactor may be cut flat and perpendicular to the axis of the tube, or may be tapered at an angle ranging from about 10 to 80 degrees. The end of the support tube may be polished or coated with an anti-static or anti-fouling material.

A purge flow of fluid (typically fresh monomer, ethylene, hexane, isopentane, recycle gas, and the like) may be introduced from outside the reactor down the support tube to aid in dispersion of the catalyst composition allowing the production of resin granular particles of good morphology with decreased agglomeration and an APS (average particle size) in the range of about 0.01 cm to 0.3 cm (0.005 to 0.10 inches). The purge flow of fluid helps minimize fouling of the end of the catalyst injection tube and support tubes. In some embodiments, the exit of the support tube may be fashioned with a nozzle at the end to form a jet or dispersion of purge fluid to aid in the distribution of the catalyst composition. In some embodiments, the internal diameter of the support tube is reduced gradually in a taper to create a nozzle to accelerate to and or disperse the fluid flow.

Embodiments described herein may be suitable for use in a polymerization process where the slurry catalyst composition is fed into injection points of the polymerization reactor. Processes may include gas phase fluid bed polymerization of one or more olefin, at least one of which may be ethylene, propylene or other monomers, in the presence of the catalyst of the slurry catalyst composition (see, for example, U.S. Pat. Nos. 4,543,399, 4,588,790, 5,028,670, 5,317,036, 5,352,749, 5,405,922, 5,436,304, 5,453,471, 5,462,999, 5,616,661 and 5,668,228). Other polymerization processes, particularly gas phase fluid bed processes, may comprise a cycle fluid that comprises a gas phase and a liquid phase.

The process of this disclosure may be directed toward a gas phase polymerization process of one or more olefin monomers having from 2 to 30 carbon atoms, preferably 2 to 12 carbon atoms, or 2 to 8 carbon atoms. The disclosure is well suited to the polymerization of two or more olefin monomers of ethylene, propylene, butene-1, pentene-1,4-methyl-pentene-1, hexene-1, octene-1 and decene-1. Other monomers useful in the process may include ethylenically unsaturated monomers, diolefins having 4 to 18 carbon atoms, conjugated or nonconjugated dienes, polyenes, vinyl monomers and cyclic olefins. Non-limiting monomers useful in the disclosure may include norbornene, norbornadiene, isobutylene, isoprene, vinylbenzocyclobutane, styrenes, alkyl substituted styrene, ethylidene norbornene, dicyclopentadiene and cyclopentene. In one class of embodiments, a copolymer of ethylene may be produced, where with ethylene, a co-monomer having at least one alpha-olefin having from 3 to 15 carbon atoms, from 4 to 12 carbon atoms, or from 4 to 8 carbon atoms, may be polymerized in the gas phase process.

The reactor pressure in a gas phase process may vary from about 690 kPa gauge (100 psig) to about 4138 kPa gauge (600 psig), from about 1379 kPa gauge (200 psig) to about 2759 kPa gauge (400 psig), or from about 1724 kPa gauge (250 psig) to about 2414 kPa gauge (350 psig). The reactor temperature in a gas phase process during the contacting step may vary from about 30° C. to about 120° C., about 60° C. to about 115° C., about 70° C. to 110° C., or about 70° C. to about 95° C.

Other gas phase processes contemplated by the disclosure may include series or multistage polymerization processes. Also gas phase processes contemplated by the disclosure may include those described in U.S. Pat. Nos. 5,627,242, 5,665,818 and 5,677,375, and European publications EP-A-0 794 200 EP-B1-0 649 992, EP-A-0 802 202 and EP-B-634 421.

The disclosure may also be directed to a polymerization process, for example, a gas phase polymerization process, for polymerizing propylene alone or with one or more other monomers including ethylene, and/or other olefins having from 4 to 12 carbon atoms. Propylene based polymers that may be produced in the process include atactic polypropylene, isotactic polypropylene, and syndiotactic polypropylene. Other propylene polymers include propylene random, block or impact copolymers.

The method of the present disclosure can use a variety of TD NMR spectrometers. As appreciated by one skilled in the art, a TD NMR spectrometer is different than a Fourier Transform (FT)-NMR, where the present method uses only a TD NMR spectrometer. Preferably, the TD NMR spectrometer is a TD $^1$H-NMR spectrometer. More preferably, the TD $^1$H NMR spectrometer is a bench-top TD $^1$H-NMR (TD $^1$H-NMR) spectrometer. An example of such a bench-top TD $^1$H-NMR spectrometer includes a Bruker Minispec MQ20 bench-top TD $^1$H-NMR System.

Preferably, the TD-NMR spectrometer is operated such that in obtaining the first TD $^1$H-NMR spectrum using the TD-NMR spectrometer and the test sample of the slurry catalyst composition the test sample is measured in the TD-NMR spectrometer at a temperature in the range of 10° C. to 70° C. A specific example of this temperature range includes measuring the first TD $^1$H-NMR spectrum in the TD-NMR spectrometer at a temperature in the range of 10° C. to 40° C.

In an additional embodiment, the TD-NMR spectrometer may also be operated such that in obtaining the first TD $^1$H-NMR spectrum using the TD-NMR spectrometer and the test sample of the slurry catalyst composition and obtaining the second TD $^1$H-NMR spectrum using the TD-NMR spectrometer for the neat sample of the suspension liquid for the solids of the slurry catalyst composition includes measuring the first TD $^1$H-NMR spectrum and the second TD $^1$H-NMR spectrum in the TD-NMR spectrometer at a same temperature in the range of 10° C. to 70° C.

With respect to the signals detected with the TD-NMR spectrometer, the decrease (decay) of magnetization in the xy-plane with time, $M_{xy}(t)$, is called the Free Induction Decay (FID) signal. The FID signal appears after a radio frequency (RF) pulse is applied to the sample. For the present disclosure, the RF pulse tips the sample $^1$H magnetization 90 degrees so that it moves from the z-axis into the xy-plane, thereby creating the xy-magnetization which is detected and obtained as the TD $^1$H-NMR spectrum. It is possible to set tip angles other than 90 degrees, but 90 is the preferred tip angle.

The time constant which describes the rate of decay of the NMR signal is called $T_2$. Liquids have $T_2$ values that are larger than those for solids, so the FID for a solid is quite rapid, whereas for a liquid it is slower, more gradual and extended in time. If the FID is sampled after any hydrogen signals associated with the solid phase have decayed to zero, the signal intensity will be attributable solely to the liquid phase. So, the method of the present disclosure involves the detection of the suspension liquid phase. For a given amount of slurry catalyst composition, the weight normalized $^1$H NMR signal intensity (obtained at 70 μs after a 90° excitation pulse), can be compared to the weight normalized signal obtained from a neat sample of the suspension liquid for the solids of the slurry catalyst composition. Equation I provides this comparison:

$$PSC = (1 - a/b \times d_b/d_a) \times 100\% \qquad \text{Equation I}$$

where the voltage signal (a) from the first TD $^1$H-NMR spectrum that represents the slurry catalyst composition and the voltage signal (b) from the second TD $^1$H-NMR spectrum that represents the suspension liquid provide and their respective densities provide the PSC. As noted above, x in Equation I is a mathematical multiplication symbol.

Knowing the PCS of the slurry catalyst composition will help in establishing a baseline catalyst performance and help in identifying process and formulation parameters for improving system optimization and performance. For example, in determining the productivity of the catalyst in the slurry catalyst composition the method further includes producing the polymer in the polymerization reactor with the slurry catalyst composition and the polymerizable feedstock. A production rate (mass/hour) of the polymer being produced in the polymerization reactor with the slurry catalyst composition and the polymerizable feedstock is determined. A slurry flow rate (mass/hour) of the slurry catalyst composition to the polymerization reactor that provides the production rate (mass/hour) of the polymer being produced in the polymerization reactor is also determined.

The productivity of the catalyst in the slurry catalyst composition can then be determined with Equation II:

$$\text{Productivity}\left(\frac{\text{mass polymer}}{\text{mass catalyst}}\right) = \frac{\text{polymer}\left(\frac{\text{mass}}{\text{hour}}\right)}{\text{Slurry Flow Rate}\left(\frac{\text{mass}}{\text{hour}}\right) * PSC}. \qquad \text{Equation II}$$

Production rate of the

It has also been discovered that the presence of gas in the test samples of the slurry catalyst composition can interfere with achieving accurate $^1$H-NMR spectra for the test samples. For example, it has been found that nitrogen gas present in the test samples can interfere with achieving accurate $^1$H-NMR spectra for the test samples.

The present disclosure helps to overcome this issue by first diluting the slurry catalyst composition before making measurements on the test samples. Preparing the test sample of the slurry catalyst composition can include diluting a predetermined mass of the slurry catalyst composition with a mass of the suspension liquid. Preferably, the predetermined mass for diluting the slurry catalyst composition is at a mass ratio of 10:1 to 25:1 (predetermined mass of the slurry catalyst composition:predetermined mass of suspension liquid) to produce a diluted sample. A more preferred mass ratio is 14:1 to 20:1 (predetermined mass of the slurry catalyst composition:predetermined mass of suspension liquid) to produce the diluted sample, where a mass ratio of 20:1 is most preferred.

The diluted sample is then used to form the test sample of the slurry catalyst composition. The test sample formed with the diluted sample is degassed by rolling the diluted sample. For example, in preparing the diluted sample of the slurry catalyst composition a tube roller is used to roll the diluted sample to remove gas bubbles from the diluted sample of the slurry catalyst composition. For the degassing, the test samples can be rolled at room temperature (23° C.) for a predetermined rolling time of 5 minutes to 10 minutes.

After rolling for the predetermined rolling time, the test samples (e.g., the test sample of the slurry catalyst composition and the neat sample of the suspension liquid for the solids of the slurry catalyst composition) can be used to prepare the first TD $^1$H-NMR spectrum and the second TD $^1$H-NMR spectrum as described herein. The densities of the test samples (diluted sample of the slurry catalyst composition and diluted sample of the suspension liquid) are also determined, as discussed herein, and the PSC of solids by mass in the slurry catalyst composition determined with Equation I, as discussed herein.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the disclosure, additionally, they do not exclude impurities and variances normally associated with the elements and materials used.

All priority documents are herein fully incorporated by reference for all jurisdictions in which such incorporation is permitted and to the extent such disclosure is consistent with the description of the present disclosure. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure.

While the disclosure has been described with respect to a number of embodiments and examples, those skilled in the art, having benefit of this disclosure, will appreciate that other embodiments can be devised which do not depart from the scope and spirit of the disclosure as disclosed herein.

Examples

Materials

PRODIGY™ BMC-200 (Univation Technologies), a bimodal catalyst (BMC).

Mineral oil, Hydrobrite 380 (Sonneborn, Petrolia Pa.).

Isopar C solvent (Exxon Mobil, Irving Tex.).

TD-NMR spectrometer—Bruker Minispec MQ20 benchtop TD-NMR System.

HN5 (Univation Technologies), a substituted non-metallocene catalyst.

CAB-O-SIL® TS-610 (CABOT Corporation), fumed silica filler.

Methylaluminoxane (MAO, Sigma Aldrich), catalyst activator.

Time Domain NMR Instrument Hardware Calibration

A neat sample consisting only of the liquid solution approximate 7.5:1 mixture of Hydrobrite 380 mineral oil and Isopar C without any catalyst power was used for instrument calibration purposes. Slurry catalyst composition and neat samples were stored at room temperature (23° C.) and mixed constantly using a roller. Slurry catalyst composition and neat samples were transferred into NMR tubes immediately before data acquisition to minimize settling.

Using a long pipette, slurry catalyst composition and neat samples were each loaded into separate 10 mm NMR tubes to a height of 3 cm, one at a time. The NMR tube was capped and inserted into the TD-NMR spectrometer. The samples were allowed to equilibrate at 35.5° C. in the instrument for 20-30 minutes. A first TD $^1$H-NMR spectrum was obtained using the TD-NMR spectrometer and the test sample of the slurry catalyst composition. A value of the voltage signal (a) was measured in the first TD $^1$H-NMR spectrum that represents the slurry catalyst composition in a range of 65 μs to 75 μs. A second TD $^1$H-NMR spectrum was obtained using the TD-NMR spectrometer and the neat sample of the suspension liquid for the solids of the slurry catalyst composition. A value of the voltage signal (b) was measured in the second TD $^1$H-NMR spectrum that represents the suspension liquid for the solids of the slurry catalyst composition in a range of 65 μs to 75 μs. The density of the neat and slurry catalyst composition was also measured accurately using a DMA 4500 densitometer (Anton Parr, Ashland Va.).

Based on the NMR signal of the neat and catalyst slurry samples as well as the respective solution densities, the instrument software calculated the PSC using Equation I, as provided herein. To check the accuracy of the method, samples with known amount of catalyst were prepared by mixing the neat solvent with the catalyst powder. The solids concentration for these accuracy calibration standards was measured using the method described above. The parity plot for these samples shown in FIG. 1, demonstrates precise solids measurement using this method with an error of ±0.3 wt %.

Further, the results in FIG. 1 also help to establish the range of solids concentration that can be measured according to the present disclosure. Additionally, the samples used to generate the parity plot (FIG. 1) were from different production batches with different powder density. The high measurement accuracy (±0.3 wt %) for all samples validates the applicability of the present disclosure for powder samples irrespective of the powder particle density.

Figure 2:
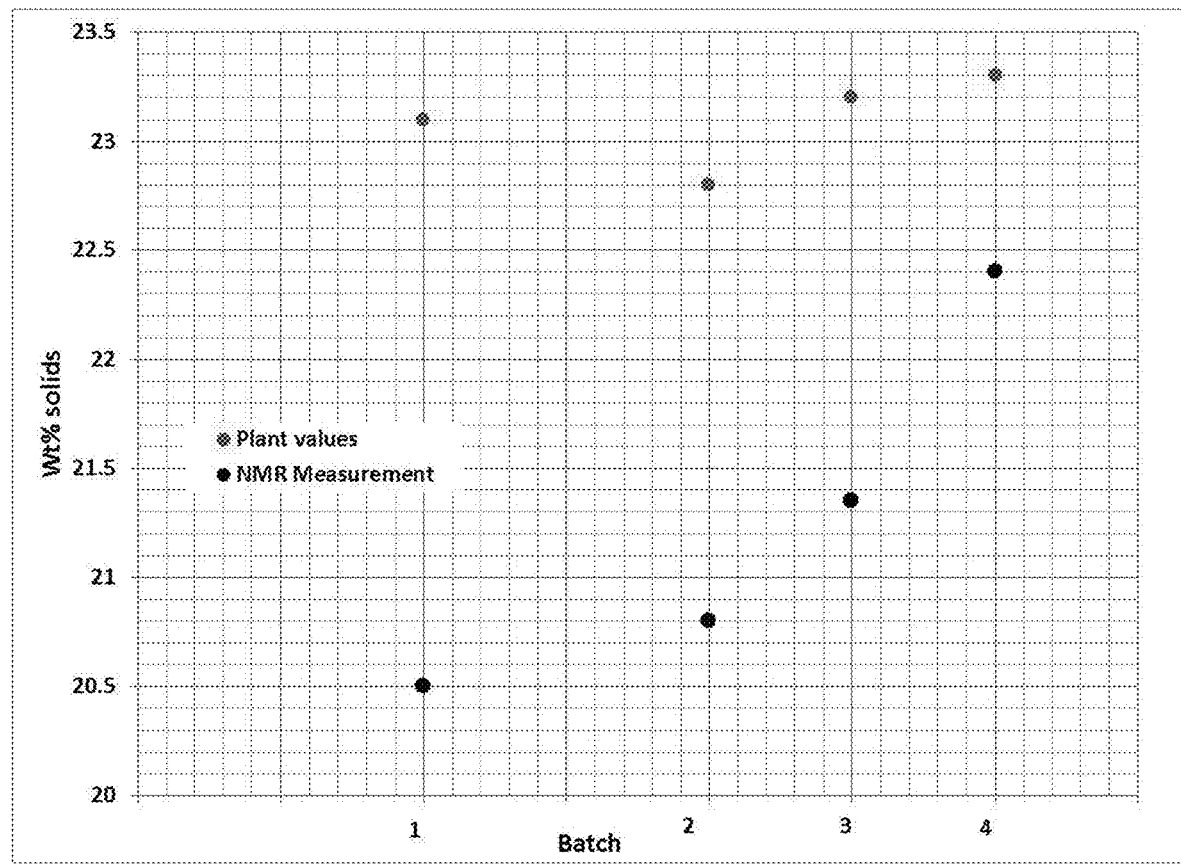
FIG. 2 is a plot of wt % solids measurements of catalyst slurries taken by plant measurements and by the method of the present disclosure.

Finally, in addition to the calibration samples, the solids content of slurry samples made in a production plant was also measured. These samples typically contain trapped nitrogen bubbles, which can render previous TD-NMR methods inaccurate. To overcome this problem, about 0.5 gm of Isopar C was accurately added to 10 gm of the slurry to obtain a gas free clear solution. Knowing the dilution factor, the solids concentration was calculated using the formula below:

Wt % solids=(Slurry wt %+Isopar *C* wt %)*measured wt % solids/slurry wt. %  Equation III Using this approach, the wt % solids in plant samples of the catalyst slurries were measured and compared with the values reported by the plant. FIG. 2 suggests that the plant values differed by up to 15% from the more accurate NMR method.

We claim:

1. A method of measuring a percent solids content (PSC) of solids by mass in a slurry catalyst composition having solids and a suspension liquid for the solids, wherein the solids of the slurry catalyst composition include a catalyst for use with a polymerizable feedstock in a polymerization reactor to produce a polymer, the method comprising:

preparing a test sample of the slurry catalyst composition;

obtaining a first time domain (TD) $^1$H-nuclear magnetic resonance (NMR) spectrum using a time domain (TD)-NMR spectrometer and the test sample of the slurry catalyst composition used in producing the polymer in the polymerization reactor, where the first TD $^1$H-NMR spectrum is measured in the TD-NMR spectrometer at a temperature in the range of 10° C. to 70° C.;

determining a value of a voltage signal (a) from the first TD $^1$H-NMR spectrum that represents the slurry catalyst composition;

preparing a neat sample of the suspension liquid for the solids of the slurry catalyst composition;

obtaining a second TD $^1$H-NMR spectrum using the TD-NMR spectrometer for the neat sample of the suspension liquid for the solids of the slurry catalyst composition, where the second TD $^1$H-NMR spectrum is measured in the TD-NMR spectrometer at the same temperature used in obtaining the first TD $^1$H-NMR spectrum;

determining a value of a voltage signal (b) from the second TD $^1$H-NMR spectrum that represents the suspension liquid for the solids of the slurry catalyst composition; and determining the percent solids content (PSC) of solids by mass in a slurry catalyst composition with Equation I:

PSC=(1−a/b×$d_b$/$d_a$)×100%  Equation I where x represents mathematical multiplication, a and b are as described above, $d_b$ is a density of the suspension liquid for the solids of the slurry catalyst composition and $d_a$ is a density of the slurry catalyst composition used in producing the polymer in the polymerization reactor, where the densities $d_b$ and $d_a$ are both measured at the temperature used in obtaining the first TD $^1$H-NMR spectrum.

2. The method of claim 1, wherein the preparing the test sample of the slurry catalyst composition for use in producing the polymer in the polymerization reactor includes:

diluting a predetermined mass of the slurry catalyst composition with a mass of the suspension liquid at a mass ratio of 10:1 to 25:1 (predetermined mass of the slurry catalyst composition:mass of suspension liquid) to produce a diluted sample; and preparing the test sample of the slurry catalyst composition with the diluted sample.

3. The method of claim 2, wherein the preparing the diluted sample of the slurry catalyst composition includes rolling the diluted sample and removing gas bubbles from the diluted sample of the slurry catalyst composition.

4. The method of claim 1, wherein the obtaining the first TD $^1$H-NMR spectrum and the obtaining the second TD $^1$H-NMR spectrum includes using for the TD-NMR spectrometer a bench-top TD $^1$H-NMR spectrometer.

5. The method of claim 1, wherein the PSC of the slurry catalyst composition used in preparing the test sample of the slurry catalyst composition is characterized by the method as having a range of 10 percent (%) to 50% of solids on a mass to mass basis.

6. The method of claim 1, wherein the obtaining the first TD $^1$H-NMR spectrum using the TD-NMR spectrometer and the test sample of the slurry catalyst composition and obtaining the second TD $^1$H-NMR spectrum using the TD-NMR spectrometer for the neat sample of the suspension liquid for the solids of the slurry catalyst composition includes measuring the first TD $^1$H-NMR spectrum and the second TD $^1$H-NMR spectrum in the TD-NMR spectrometer at a same temperature in the range of 10° C. to 70° C.

7. The method of claim 1, wherein the suspension liquid for the solids includes a hydrocarbon carrier liquid.

8. The method of claim 1, including producing the polymer in the polymerization reactor with the slurry catalyst composition and the polymerizable feedstock;

determining a production rate (mass/hour) of the polymer being produced in the polymerization reactor with the slurry catalyst composition and the polymerizable feedstock;

determining a slurry flow rate (mass/hour) of the slurry catalyst composition to the polymerization reactor that provides the production rate (mass/hour) of the polymer being produced in the polymerization reactor; and determining a productivity of the slurry catalyst composition with Equation II:

Equation II $$\text{Productivity}\left(\frac{\text{mass polymer}}{\text{mass catalyst}}\right) = \frac{\text{polymer}\left(\frac{\text{mass}}{\text{hour}}\right)}{\text{Slurry Flow Rate }\left(\frac{\text{mass}}{\text{hour}}\right) * PSC}.$$

9. A method, comprising:
producing a polymer in a polymerization reactor with a slurry catalyst composition and a polymerizable feedstock;

determining a production rate (mass/hour) of the polymer being produced in the polymerization reactor with the slurry catalyst composition and the polymerizable feedstock;

measuring a percent solids content (PSC) of solids by mass in the slurry catalyst composition having solids and a suspension liquid for the solids, wherein the solids of the slurry catalyst composition include the catalyst used with a polymerizable feedstock in the polymerization reactor to produce the polymer, where measuring the PSC includes:

preparing a test sample of the slurry catalyst composition;

obtaining a first time domain (TD) $^1$H-nuclear magnetic resonance (NMR) spectrum using a time domain (TD)-NMR spectrometer and the test sample of the slurry catalyst composition used in producing the polymer in the polymerization reactor, where the first TD $^1$H-NMR spectrum is measured in the TD-NMR spectrometer at a temperature in the range of 10° C. to 70° C.;

determining a value of a voltage signal (a) from the first TD $^1$H-NMR spectrum that represents the slurry catalyst composition;

preparing a neat sample of the suspension liquid for the solids of the slurry catalyst composition;

obtaining a second TD $^1$H-NMR spectrum using the TD-NMR spectrometer for the neat sample of the suspension liquid for the solids of the slurry catalyst composition, where the second TD $^1$H-NMR spectrum is measured in the TD-NMR spectrometer at the same temperature used in obtaining the first TD $^1$H-NMR spectrum;

determining a value of a voltage signal (b) from the second TD $^1$H-NMR spectrum that represents the suspension liquid for the solids of the slurry catalyst composition; and determining the percent solids content (PSC) of solids by mass in a slurry catalyst composition with Equation I:

$$PSC = (1 - a/b \times d_b/d_a) \times 100\%  \qquad \text{Equation I}$$

where x represents mathematical multiplication, a and b are as described above, $d_b$ is a density of the suspension liquid for the solids of the slurry catalyst composition and $d_a$ is a density of the slurry catalyst composition used in producing the polymer in the polymerization reactor, where the densities $d_b$ and $d_a$ are both measured at the temperature used in obtaining the first TD $^1$H-NMR spectrum;

determining a slurry flow rate (mass/hour) of the slurry catalyst composition to the polymerization reactor that provides the production rate (mass/hour) of the polymer being produced in the polymerization reactor;

determining a productivity of the slurry catalyst composition with Equation II:

Equation II $$\text{Productivity}\left(\frac{\text{mass polymer}}{\text{mass catalyst}}\right) = \frac{\text{polymer}\left(\frac{\text{mass}}{\text{hour}}\right)}{\text{Slurry Flow Rate }\left(\frac{\text{mass}}{\text{hour}}\right) * PSC}.$$

10. The method of claim 9, wherein the obtaining the first TD $^1$H-NMR spectrum and the obtaining the second TD $^1$H-NMR spectrum includes using for the TD-NMR spectrometer a bench-top TD $^1$H-NMR spectrometer.

* * * * *